United States Patent [19]

Getreuer et al.

[11] Patent Number: 5,031,166
[45] Date of Patent: Jul. 9, 1991

[54] OPTICAL DISK TRACKING AND SEEKING SYSTEMS AND SPECIFIC TRACK FORMATS USING DISCONTINUITIES AND CIRCUITRY THEREFOR

[75] Inventors: Kurt W. Getreuer, Colorado Springs, Colo.; Johannes J. Verboom, Bergeyk; Sonneville, Pierre R., Weert, both of

[73] Assignee: Laser Magnetic Storage International Company, Colorado Springs, Colo.

[21] Appl. No.: 410,607

[22] Filed: Sep. 21, 1989

Related U.S. Application Data

[63] Continuation of Ser. No. 148,028, Jan. 25, 1988, Pat. No. 4,879,707, which is a continuation of Ser. No. 760,439, Jul. 30, 1985, abandoned.

[51] Int. Cl.$^5$ ............................................. G11B 7/095
[52] U.S. Cl. ........................ 369/44.26; 360/44.34; 360/44.36; 360/105; 360/275.3
[58] Field of Search ..................... 369/44-46, 369/100, 105, 106, 109, 124, 275, 277, 275.3, 275.4; 358/342; 360/77.01-77.03, 77.06-77.08, 77.11

[56] References Cited

U.S. PATENT DOCUMENTS

| | | | |
|---|---|---|---|
| 4,037,252 | 7/1977 | Janssen | 250/202 X |
| 4,100,577 | 7/1978 | Naruse et al. | 250/201 X |
| 4,135,083 | 1/1979 | Van Alem et al. | 369/45 X |
| 4,209,804 | 6/1980 | Dil | 369/109 X |
| 4,232,337 | 11/1980 | winslow et al. | 369/44 |
| 4,234,837 | 11/1980 | Winslow | 369/44 X |
| 4,236,105 | 11/1980 | Wilkinson | 369/44 X |
| 4,238,843 | 12/1980 | Carasso et al. | 365/234 |
| 4,243,850 | 1/1981 | Edwards | 369/46 |
| 4,271,334 | 6/1981 | Yardy | 369/44 X |
| 4,344,165 | 8/1982 | Akiyama | 369/44 |
| 4,358,796 | 11/1982 | Cheskovsky et al. | 369/44 X |
| 4,364,118 | 12/1982 | Maeda et al. | 369/44 |
| 4,366,564 | 12/1982 | de Haan et al. | 369/48 |
| 4,370,679 | 1/1983 | Ceshkovsky et al. | 369/124 X |
| 4,375,088 | 2/1983 | de Haan et al. | 369/44 X |
| 4,402,061 | 8/1983 | Hazel et al. | 360/46 X |
| 4,406,000 | 9/1983 | Shoji et al. | 369/44 |
| 4,428,069 | 1/1984 | Hazel et al. | 369/100 X |

(List continued on next page.)

FOREIGN PATENT DOCUMENTS

| | | |
|---|---|---|
| 0068548 | 1/1983 | European Pat. Off. . |
| 0099576 | 2/1984 | European Pat. Off. . |
| 8000122 | 1/1980 | Netherlands . |
| 2069219 | 8/1981 | United Kingdom . |

Primary Examiner—Roy N. Envall, Jr.
Assistant Examiner—W. R. Young
Attorney, Agent, or Firm—Sheridan, Ross & McIntosh

[57] ABSTRACT

An optical disk recording system including a record medium is disclosed for providing an accurate track crossing count and an accurate track following signal. A first embodiment utilizes off-centered wobbled areas located in the headers of the record medium. The high frequency content of a first signal is combined with the low frequency content of a second signal, which is generated using the wobbled areas. In another embodiment, light-reflective discontinuities are provided in the header areas of the record medium. A qualifier and an AGC are utilized in providing a corrected track following signal. In still another embodiment, reflective discontinuities are located in the servo areas of the record medium. In such an embodiment, it is preferred that there be a fixed gain adjustment to a radial push-pull signal. With regard to each of the three aforesaid embodiments, a track following signal is corrected to compensate for aberrations that are caused by a shift of the light beam returned from the record medium surface. In yet another embodiment, the track following signal is generated using only the central aperture or wobble signal. In this embodiment, it is preferred that three pits be utilized in connection with the track following operation. The three pits are provided in two servo bytes of information located in the servo areas. Two of the three pits are wobble pits and the third pit is used in clocking.

3 Claims, 8 Drawing Sheets

U.S. PATENT DOCUMENTS

| | | | |
|---|---|---|---|
| 4,432,082 | 2/1984 | Hsieh et al. | 369/32 |
| 4,432,083 | 2/1984 | Hsieh et al. | 369/44 |
| 4,443,870 | 4/1984 | Hazel et al. | 369/44 |
| 4,446,545 | 5/1984 | Van Dijk | 369/44 |
| 4,456,981 | 6/1984 | Silvy et al. | 358/342 X |
| 4,464,714 | 8/1984 | Huijser et al. | 369/44 X |
| 4,472,750 | 9/1984 | Klumpp et al. | 360/77 X |
| 4,476,555 | 10/1984 | Joichi et al. | 369/44 |
| 4,486,791 | 12/1984 | Wada et al. | 358/342 |
| 4,489,406 | 12/1984 | Hsieh et al. | 369/32 |
| 4,544,838 | 10/1985 | Musha et al. | 369/44 X |
| 4,553,228 | 11/1984 | Gerard et al. | 369/275 X |
| 4,561,082 | 12/1985 | Gerard et al. | 359/275 X |
| 4,562,564 | 12/1985 | Bricot et al. | 369/44 |
| 4,613,961 | 9/1986 | Aarts | 369/44 |
| 4,646,278 | 2/1987 | Okano | 369/44 X |

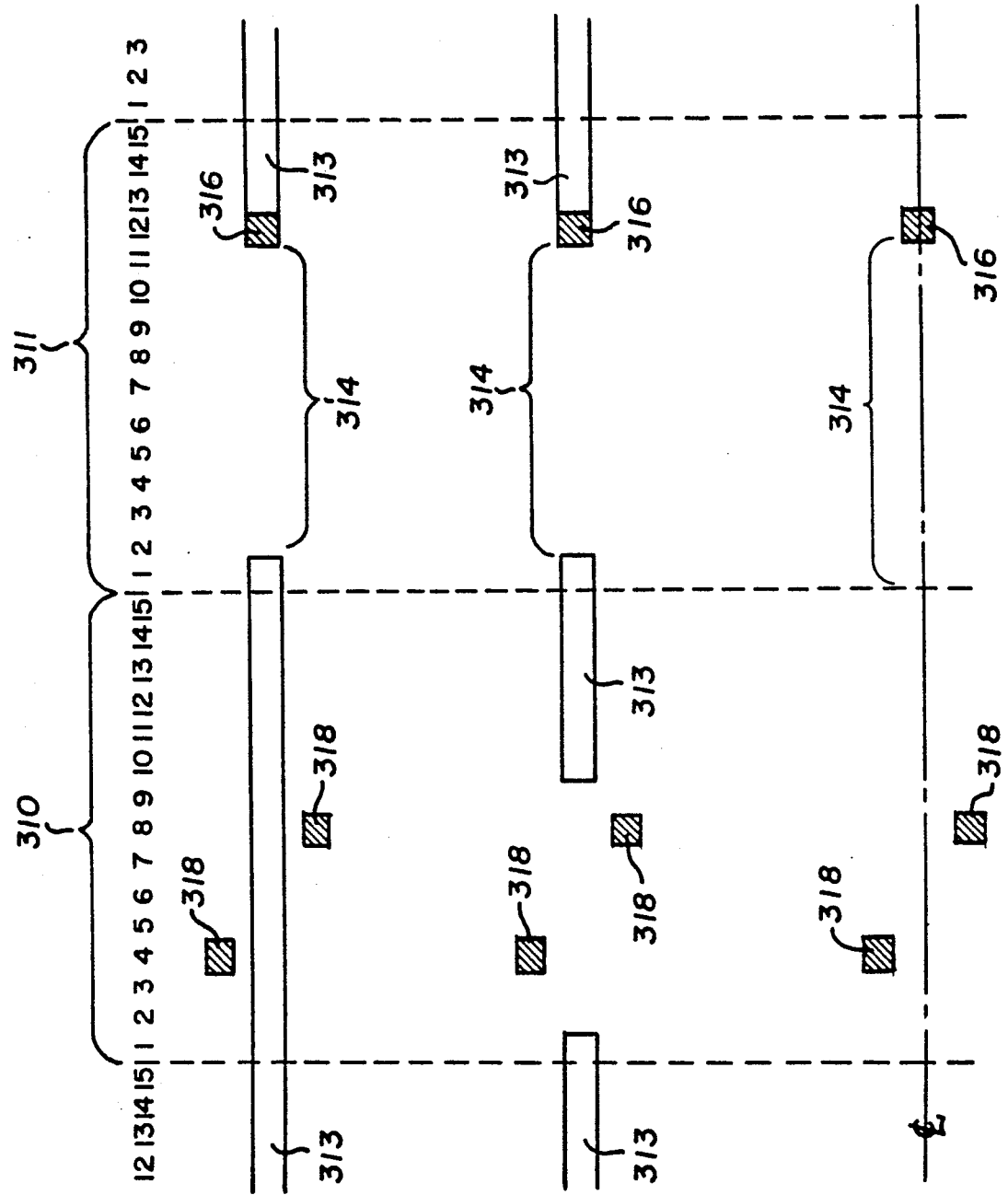

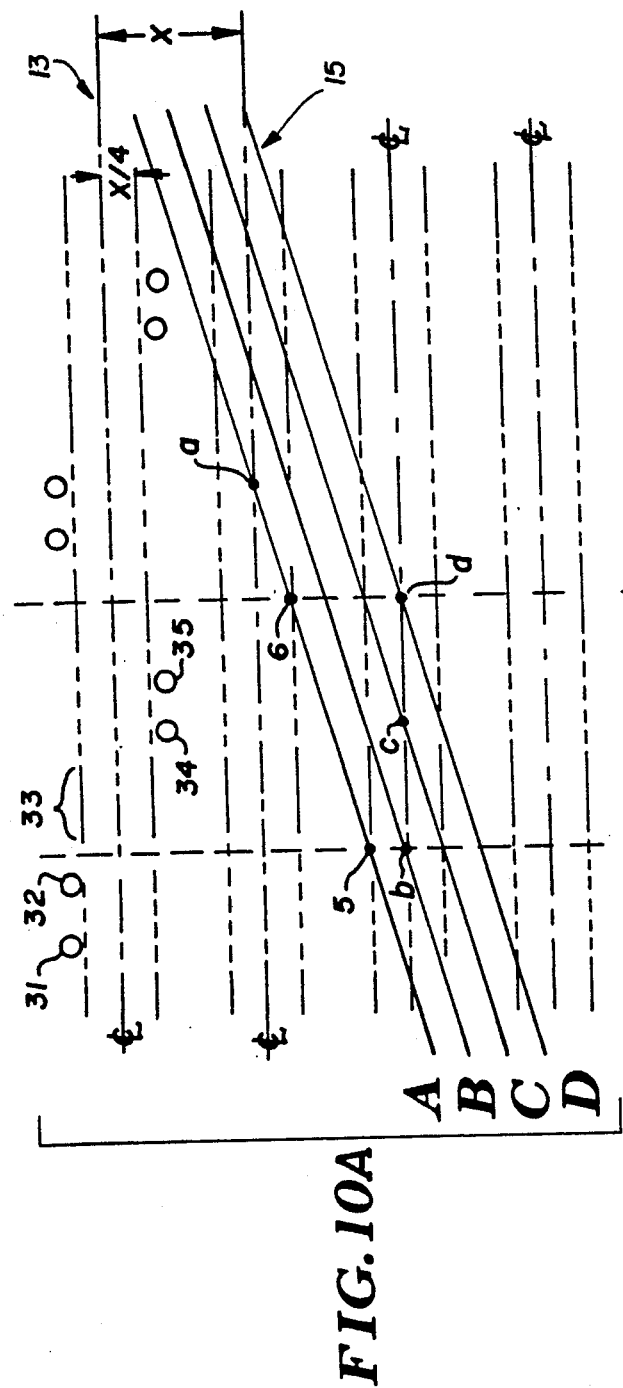
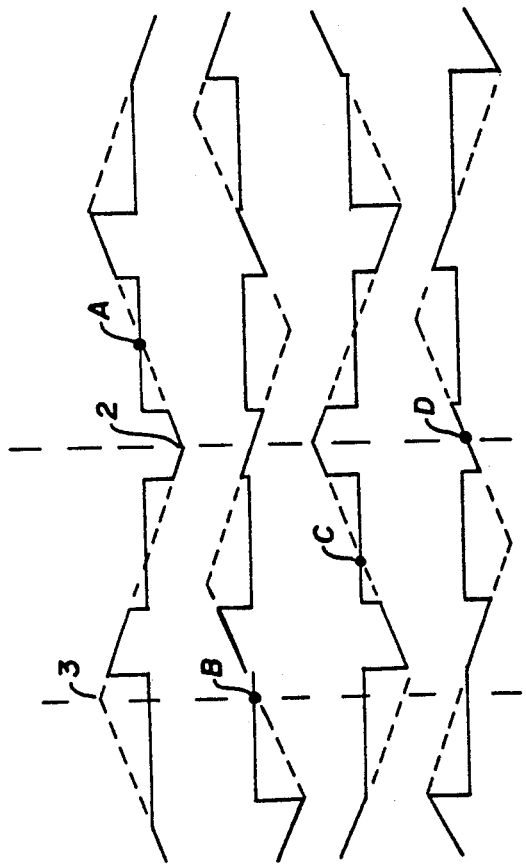
FIG.10A
FIG.10B
FIG.10C
FIG.10D
FIG.10E

OPTICAL DISK TRACKING AND SEEKING SYSTEMS AND SPECIFIC TRACK FORMATS USING DISCONTINUITIES AND CIRCUITRY THEREFOR

This is a continuation of application Ser. No. 07/148,028, filed Jan. 25, 1988, now U.S. Pat. No. 4,879,707, which is a continuation of application Ser. No. 06/760,439, filed July 30, 1985, now abandoned.

This invention relates to systems for maintaining read/write or read beams on the center of a track in which optically readable information is, or is to be, recorded or erased; and more particularly to such systems where the tracking information for centering and counting tracks is made present in the record medium.

BACKGROUND OF INVENTION

Several systems exist to center a radiation beam's incident spots on information track centers, but these other systems have several limitations, and for commercially feasible systems which provide optical recording densities on the order of 1000M bytes to a 30 cm disk, a highly accurate system must be deviced.

In the preferred form of this invention, a single beam is directed at an angle to the disk or recording medium surface, and a detector receives the reflected beam which has been modulated by the disk surface. Parsing the signal generated by the detector means yields accurate information concerning the location of the beam relative to the track center and concerning the data in the track. In another "seek" mode, the number of tracks crossed can be parsed from the same signal.

The concepts disclosed herein may be applied to the use of a separate beam for writing, multiple detector beams, or splitting the reflected beam between a multiplicity of detectors, provided that the format limitations on the configuration of track sector headers on the recording medium surface are adhered to and/or that such format limitations are used in accord with the methods described for track following or track counting.

The preferred embodiments employ a reflective media surface, physically responsive to radiation (of laser light for these embodiments). However, the invention can apply to various forms of media, including reflective and transmissive, and physically or chemically radiation responsive media so long as the novel and useful structure described herein is employed.

Generally, as is the case in the preferred embodiments described herein, disk media is "mastered," created with data tracks (grooves), non-data areas (generally lands surrounding the grooves) and servo or adjustment areas (called headers, situate at spaced locations in and about the centerline of the grooves). These are all in the information layer or plane of the disk. Disk media may be "mastered" with data too, and completely blank disk media may at some future date be sold for use in optical drives which do the mastering themselves, using the same equipment which reads and writes data.

The inventive concepts described herein may apply to each of these media forms, but in the Detailed Description of Preferred Embodiments only one form is described and the information bearing layer's detectable modulations due to writing are therein referred to as "pits" although these pits may be bumps or other manifestations when a different media is employed.

One existing type of system for centering a beam of radiation in a track is shown in U.S. Pat. No. 4,271,334 which provides for the dithering or wobbling of the beam (or related beam) within or across the width of the track as the track passes. An error signal is produced using the increase in the reflected beam's average intensity (which increases as the beam gets farther off-center), and the fact that the reflected beam's intensity variation produces a phase angle with the dither signal on only one side of the track. The amount of increased intensity reflects the magnitude of the off-center error and the direction of the off-center error is found in the existence or nonexistence of the phase angle between the dither signal and the reflected intensity variation signal. U.S. Pat. Nos. 4,236,105 and 4,234,837 describe a dither system which uses "switching lines" to signal the servo mechanism to change direction. Dithering, or active wobbling, has inherent design problems however, which prevent its easy implementation in write/read systems.

In U.S. Pat. No. 4,243,850, the tracking error signal is generated by the use of three read beams' spots in which the outer two spots' reflections gain or lose intensity when they come in contact with the information pits or hills of adjacent tracks. This signal is a differential signal generated by paired photodetectors which read these outer reflected beams, the absolute value of the difference showing the magnitude of the error and the fact of a positive or negative difference indicating the direction of the error.

Other systems employ the diffraction of light by track edges themselves to generate a track following error signal called a push-pull signal described in U.S. Pat. Nos. 4,232,337; 4,209,804 and 4,100,557. Difficulties with these systems are discussed in more detail below but basically inaccuracies in beam alignment cause undiscoverable flaws in the push-pull signal, making it an inaccurate measure of tracking.

Other systems use an error signal generated by the disk track's surface structure wobbling with respect to the line of information pits embedded in the center of the track. This error signal may be generated by the sinusoidal variations caused by a wobbling groove in which the data pits lie on a straight path as described by U.S. Pat. No. 4,135,083 (at the top of column 8), or by a series of off-center prewritten data pits spaced continuously around the track on either side of the data path center line at predetermined intervals as in Netherland's U.S. Pat. Nos. 8,000,121; 8,000,122; 8,103,117 and 8,102,621. In using continuous "passive" wobbling techniques such as these, while they do eliminate the problems associated with active wobble or dithering techniques, the retrieval or parsing-out of the tracking signal (given at the wobble frequency) may be difficult, primarily because the relevant beam spot must first be in track to get a phase lock onto the wobble frequency, and also because of poor signal to noise ratios. In those where many pits are required for timing or track following, rather than wobbling the groove itself, as is required by U.S. Pat. No. 4,456,981, the amount of disk space available for data may be reduced because data cannot be written in the groove adjacent to such wobbled pits. The only abbreviated wobble pit pattern found in the extant art was in U.S. Pat. No. 4,428,069 which did not provide a means for correcting its inaccuracies nor does it in any way, indicate the use of a push-pull signal nor many of the improvements found herein. (The use of wobbled pits in headers for centering has been found in the magnetic recording art too, see for example, U.S. Pat. No. 4,472,750).

One system described a corrected error signal; U.S. Pat. No. 4,476,555. In that patent a "traverse" signal which may roughly correspond to the "central aperture signal" herein is used with a counter and RAM to correct the tracking error signal at a rate of one time per disk rotation, whereas this invention corrects the tracking error signal continuously at each header. Even assuming that the "traverse" signal is a central aperture signal, there is no indication of how it is derived. In the present application, the limitations are taught and claimed which provide for a correcting signal to be generated in the central aperture signal, as well as how to decode the signal to get the corrected tracking information.

Another system for correcting a tracking signal is described in European Patent Application No. EP0099576A2. That system uses a discontinuity or flat mirror area, and the signal derived therefrom to correct the push-pull signal generated by a track groove. It does not address the problems with signal strength variation caused by written data and reflected light level variations. Neither does it address how to handle errors in location of the blank or "mirror" areas, nor defects around such "mirror" areas.

It should be noted that the diffraction patterns generated by a beam wandering to one side or the other of a track or groove (found in the low frequency push-pull signal) have proven to be unreliable for measuring track following when uncorrected. This is due to shifts in the position of the reflected beam relative to the center of the photodetecting means and the inability to detect what caused the shift. These shifts may be caused by instability in the optics, mechanical displacements, or laser beam intensity distribution itself. This invention solves these problems because the track following signal is a combination of the push-pull signal and a correction signal. In both embodiments the correction signal is derived from the return beam modulated by the header structure of the information track being followed.

One branch of embodiments of the present invention uses a short pattern of wobbled or off-center-line pits or holes combined with the push-pull signal to produce a corrected tracking error signal. The modulation due to the off-center-line pits is found in the central aperture signal, which is derived from the full reflected beam. It also uses the push-pull signal to count track crossings.

The second branch of embodiments of this invention uses the discontinuities in the groove of a track sector header in order to correct the push-pull signal rather than the wobbled pits just mentioned. In this embodiment too, the counting of the changes in the push-pull signal which occur due to the crossing of the beam spot over each track may also be employed to determine relative track address. However, where the invention employs continuous grooves (as in the first mentioned embodiment branch if used without discontinuities) there is no theoretical limitation to track crossing (or seek) speed, whereas there are seek speed limits beyond which an accurate track count may not be possible where tracks are supplied with discontinuities.

A decision relating to which embodiment to use may depend on various considerations including those just described, and extrinsics, such as the cost to produce the system. Of course, the sets of electronics described which decode either the first or the second media embodiment may be included in one system which could work with either of the two basic high data density media structures described.

SUMMARY OF THE INVENTION

Basically, the present invention provides for formatted surfaces on a recording disk medium so arranged and disposed that a beam reflected from this surface can be employed to generate and correct a track following signal and also to generate track counting signals. It also provides a method to generate these signals. These signals can be used to direct servo mechanisms to dynamically adjust and readjust positioning of the beam relative to the information track center.

In some of the preferred embodiments, a clock signal is provided by reflections from a sine wave floor in the data track groove. In those embodiments employing servo areas within sectors, a timing pit is used for clocking. Pits representing data may be written in the center of the track groove and pits to provide servo information may be written "wobbled" to each side or on the center line in the header areas. These servo pits are written in a known format (or pattern) and receipt of that format is monitored. The track-following correction given by the push-pull signal is not used to the extent it does not conform to the expected pattern. In the second branch of embodiments, discontinuities in the header-area are used to correct the track following signal and two distinct patterns are taught which may be used for different disk sizes or applications.

In the invention, convenient track counting signals are found in the sinewave type changes in push-pull signal as a track seeking operation moves the radiation beam radially over the disk surface.

The push-pull signal is described in the U.S. Pat. Nos. 4,232,337; 4,209,804 and 4,100,557 cited above, but basically it is a measure of the different strengths on two sides of the center of the reflected beam. These different strengths are due to changes in the diffraction patterns in the reflected beam. These changes depend on the transverse location of the beam spot relative to the track center line. This diffraction pattern is due to the differences in phase between that portion of the beam which is reflected from a land on the side of a track and that portion which is reflected from the track floor.

BRIEF DESCRIPTION OF THE DRAWINGS

FIGS. 4B, 4D, 4E, and 4F show different header patterns. FIG. 4C depicts the location of the headers of FIGS. 4B, 4D, 4E and 4F vis-a-vis data areas on a typical track.

FIG. 10A depicts adjacent track sector header areas in an area of the record medium.

FIGS. 10B, 10C, 10D and 10E are highly schematic timing diagrams of a triangular representation of what in reality should be a sinewave push-pull signal generated by the beam spot track crossings of FIG. 10A.

DETAILED DESCRIPTION OF THE PREFERRED EMBODIMENTS

Figure 1:
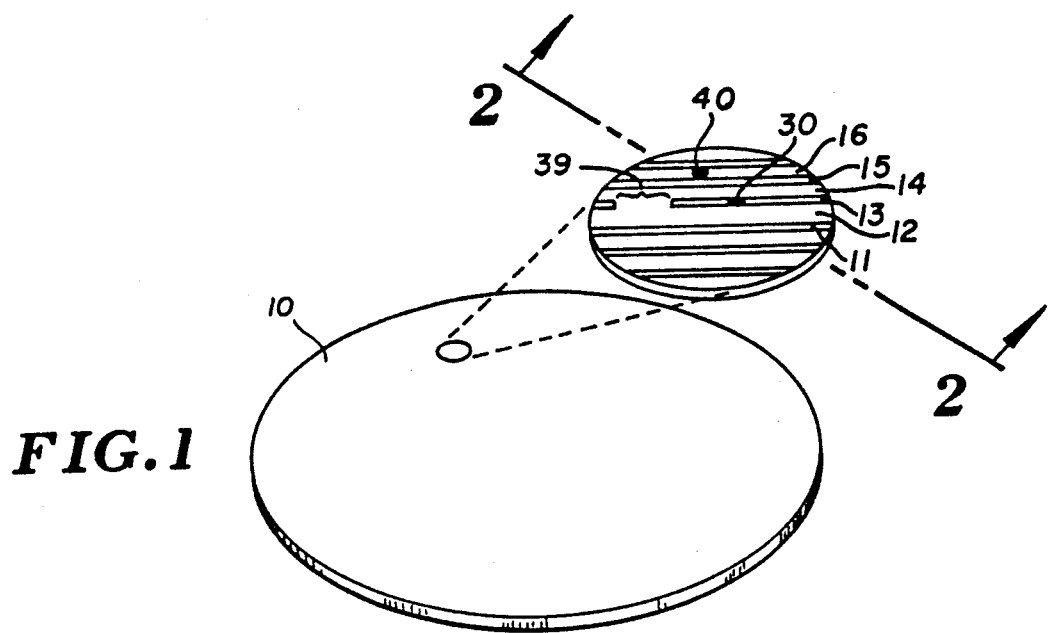
FIG. 1 is a representation of the top view of the disk recording medium depicting the track grooves and track lands greatly exaggerated in size.

FIG. 1 shows a typical recording disk 10, employing so-called "ablative" media, a segment of which is enlarged to show detail. As discussed previously, this is only representative media and various types may be employed to take advantage of the concepts disclosed herein. The enlargement shows a data pit 30 and a servo pit 40 situated as they would appear in tracks 13 and 15 respectively. A discontinuity 39 is shown in track 13 also. The informational or data tracks, before being written are known as pre-grooves. Between each track on the information surface or layer of the recording medium is a land, depicted in FIG. 1 as, for example, land 14 between tracks 13 and 15. Information tracks may be arranged in a concentric or spiral pattern over the information plane of the recording medium 10. (It is possible that the tracks might be oriented in a parallel series on a slidable planar medium or possibly on a tape, but currently such media are not in use for radiation based data storage.)

Generally, pits 30 and 40 are representative of the pits to be written on the surface of the recording medium of the preferred embodiments. "Pits" may vary in nature as required by the particular media employed. Minimally, it is required that there be a "change", modulation, or transformation which allows, alters or disallows the transmission or reflection of an incident radiation beam from or through the media. In other words, the manifestation of a modulation (which is a pit in this patent), whatever the media, must affect the incident radiation beam differently than does the rest of the media's information layer and this difference must be detectable. Note that in various media, the information layer may be at the surface or at some plane within the disk. The form of the data tracks and non-data areas may vary in structure too, to accommodate other media, without deviating from the teachings of this invention. In short, this invention may be used with numerous media forms.

In the preferred embodiments, the pits are nonreflective, and the disk at every other point in the information plane is optically reflective. The pits thus create a modulation in the resultant signal level when the beam spot passes over them.

Figure 2:
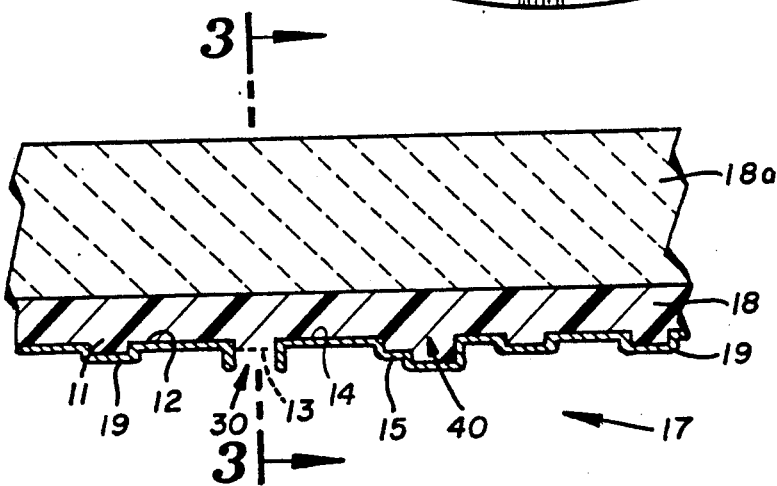
FIG. 2 is a cross-sectional view of the surface of the recording medium, taken at line 2—2 of FIG. 1.

FIG. 2, a section view of the enlarged section of information layer 19 in FIG. 1, shows pits written into the surface of the recording medium and the lands and tracks in the preferred embodiments. The information layer 19 is seen covered by a clear photopolymer lacquer layer 18. Above layer 18 in the preferred embodiments may be a substantially clear substrate layer 18a such as glass, for structural strength, through which the laser or other radiation may easily pass. Data pit 30 may typically be approximately 0.9 micrometers wide and, written properly in the center line of the track, it extends beyond both edges of the track 13. Likewise, wobble pit 40 partially obliterates land 6 and is of the same order of magnitude in size as data pit 30. Lands such as lands 12 and 14 are approximately 1 micrometer wide, tracks are approximately 0.6 micrometers wide. For the preferred embodiments, the information layer 19 (the ablative surface) is a reflective tellurium or rhodium layer which is deposited on the entire surface of the recording medium structure and it ablates to form a hole or a pit (such as data pit 30) where a radiation or laser beam of appropriate power strikes the recording surface, layer 19, of the media. The average depth of the track groove, for example track 11, is equal to one-eighth of the wave length of the radiation beam. This depth is known to generate, by causing diffraction of the beam, the most pronounced "push-pull" signal. The use of this push-pull signal to generate track following information is well-known in the art. See, for example, U.S. Pat. No. 4,209,804.

A push-pull signal with higher frequency content is generated during seeking (track crossing) because of the rapid push-pull signal change as the beam moves radially over a number of tracks. A sine wave signal is thus created where each cycle indicates one track crossing. Data pits written by the user may affect the push-pull signal quality at higher frequencies, and may prohibit proper track counting at higher seek velocities. This can be partially avoided by selecting a proper data modulation code with a so-called "D.C. free" frequency spectrum as, for example, that shown in U.S. Pat. No. 4,464,714.

For track following, the push-pull signal's low frequency part may not be accurate. Abberations in the validity of the push-pull signal are caused by a shift of the beam returned from the disk surface with respect to the center line of the photodetector. These beam shifts may be caused by optomechanical instability, laser pointing instability, tilt of the disk itself, displacements of the actuator, and intensity shifts in the laser beam distribution and perhaps other causes.

Figure 5:
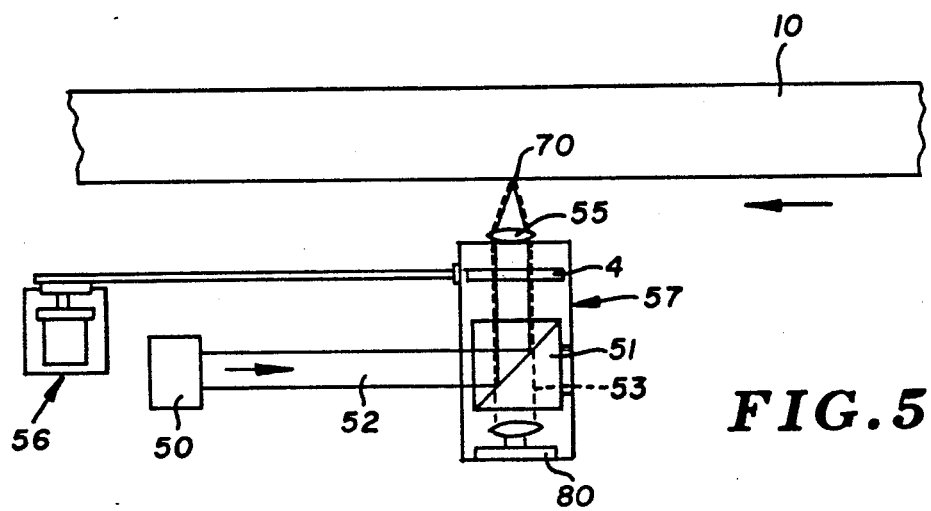
FIG. 5 is a schematic diagram depicting a laser light path to the surface of recording medium and reflected therefrom in a typical structure employing this invention.

In data read/write systems used with this invention, an optical system such as that depicted in FIG. 5 is likely to be employed. A laser 50 generates a beam 52 which is directed toward a generic optical path 57, routed by polarizing beam splitter 51 through quarterwave plate 4, through the objective lens 55 so that beam 52 is reflected and modulated by disk 10 at beam spot 70 and reflected back into objective lens 55 thereby becoming reflected beam 53 which follows a different optical path through quarterwave plate 4 and polarizing beam splitter 51 to its impingement on quad detector 80. The entire generic optical pathway 57 may be movable radially with respect to the disk in response to an actuator-servo means 56.

Figure 6:
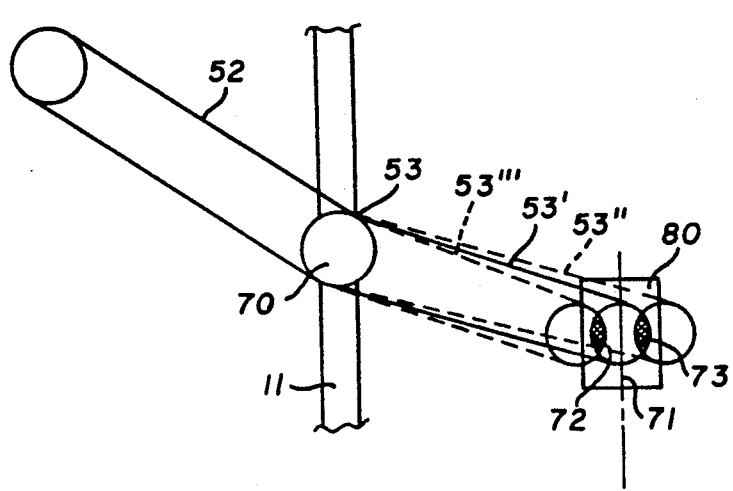
FIG. 6 represents the diffracted light spots which are generated by the reflected and diffracted beam returning from the surface of the recording medium as they strike the quad detector or split diode photodetector.

FIG. 6 depicts beam 52 being reflected from track 11 at beam spot 70 to form reflected beam 53. The outline of a quad photodetector 80 is shown in the far field of the reflected beam 53, and positioned so as to receive a zeroth order diffraction area 53' and first order diffraction areas 53" and 53'" which create an interference pattern on quad detector 80. The interference pattern drawn in FIG. 6 is representative of a properly aligned and centered beam 52. The evenness of destructive interference fringes 72 and 73 cause equal signals to be generated by each side of quad detector 80.

Figure 7A:
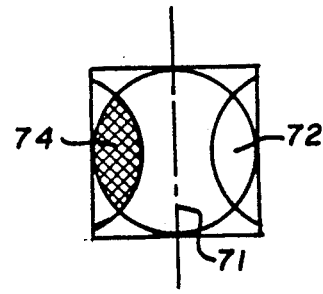
FIG. 7A depicts the light spot as it appears on the photodetector in the path of the reflected light beam.
Figure 7B:
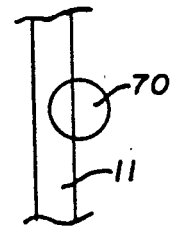
FIG. 7B depicts the position of the light spot on the surface of the recording medium which produces the diffraction pattern of FIG. 7A.

An off-track interference pattern is depicted in FIG. 7A. Zeroth order beam spot 71 is still located centrally on the quad detector 80 because reflected beam 53 is directed that way. An interference between the zeroth order beam 53 and the plus first order diffraction area 53" is shown in the interference spot 72, while the destructive interference between the zeroth and minus first order diffracted beams is seen in area 74, and therefore, a weaker resultant signal is found on that side of the quad detector 80. FIG. 7B depicts the position of beam spot 70 which, in a properly aligned system, would create the interference pattern in FIG. 7A on quad detector 80, relative to track 11.

The push-pull tracking error signal is the difference between the signal strength generated by one side of the quad detector and that generated by the other. The direction and the magnitude of error is given by the sign and value of the difference between the signals.

Where the reflected beam and its diffraction and interference patterns are not correctly aligned with the photodetector diode (quad detector 80), or were the beam intensity is not properly distributed across the entire spot 70, it can be easily understood that false tracking error signals will be generated using an uncorrected push-pull signal reliant method. This invention provides means to self-correct these errors in a continuous and automatic fashion with several media configurations.

Variations in the format of the media which may be employed to correct track following signals will next be described, then descriptions of how these are employed by the preferred embodiments will follow.

In general, the relevant variations occur in sector header areas, the information track being divided into these headers and associated adjacent data bearing sectors.

Figure 4A:
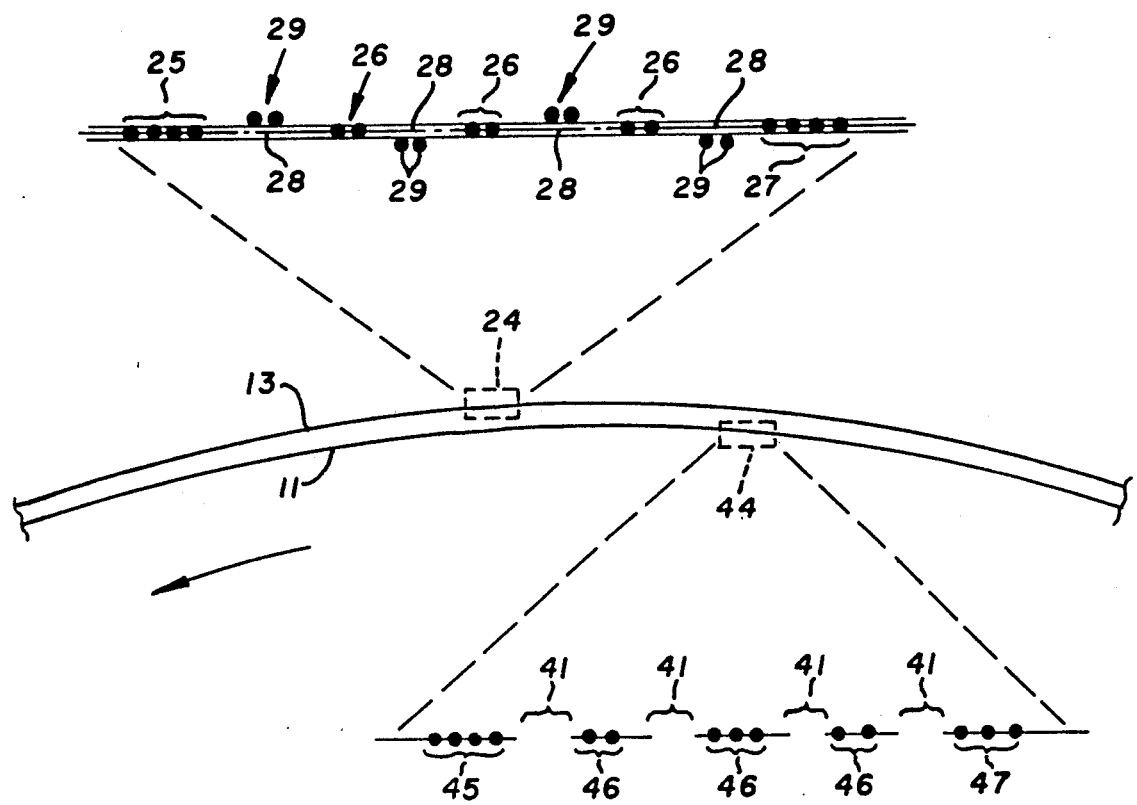
FIG. 4A schematically illustrates header areas with a first enlarged area illustrating the use of wobbled pits and a second enlarged area illustrating the use of light-reflective discontinuities.

A typical sector header is illustrated in FIG. 4A. The wobbled off-center pits provide an expected pattern which produces an error signal in the following way. The presence of a pattern of off-center pits in a certain format is expected and confirmed by reading them. This confirmation is critical when a small number of headers is used per unit of track length.

Where the signal which depicts the read pattern is missing the pits expected on one side only, or where the signal is weaker when the expected pattern on one side is passed and confirmed than when the expected pattern on the other side is passed and confirmed, it is apparent that the beam spot is following more to the side of the track with the stronger signal.

Discontinuities in the track provide for a similar function in a dissimilar way. Their presence gives a signal which directly reflects the beam misalignment or anomoly in the push-pull signal, because the discontinuity is a flat reflective surface. Accordingly the electronics to incorporate this information into the track following servo signal must be different than those employing the wobbled pit patterns suggested above. Also there are differences in the systems required to use the several discontinuity patterns described, the main differences being between those where the discontinuities are only in the headers and those where the discontinuities are present in special servo bytes in the data area.

FIG. 4A shows two tracks 11 and 13 a segment of each of which illustrates the two embodiments just described which have servo information (modulations) in the header only. Track 13 has the wobbled pits 29, and track 11 the discontinuities 41. The enlarged segments depict header 24 from track 13 and header 44 from track 11. The use of synchronization pits 25 and 45, qualifier pits 26 and 46 and address pits 27 and 47 are enhancements described in detail below. It should be noted that track 13 may be discontinuous at the point 28 and where each wobbled pit segment exists without affecting the ability to derive a corrected tracking signal from such a header. A two pit to each side pattern as shown will work as will any wobbled pattern which is recognizable, balanced and known or expected will work.

If the spot is moving along the track centerline, the average sum signal will be equal when passing the left and right wobbled pit locations. If the loss is greater during the passing of the right side then it is clear that the spot is centered toward the right of the track centerline.

Figure 3:
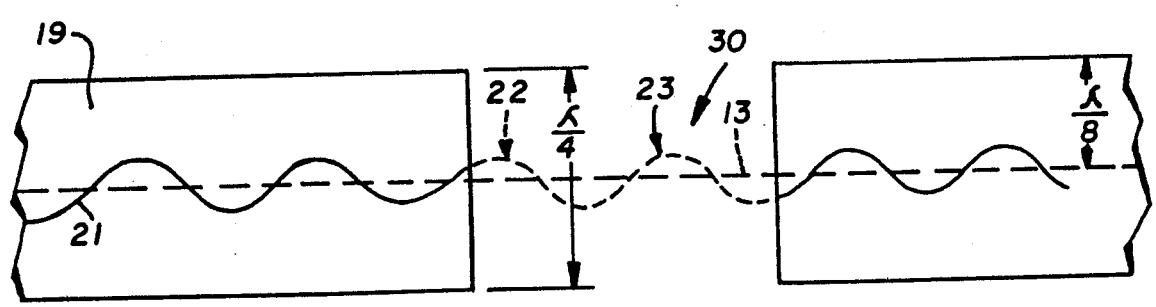
FIG. 3 is a cross-section of the surface of the recording medium taken at line 3—3 of FIG. 2.

More detail regarding the track design in preferred embodiments can be seen in FIG. 3, depicting a section down the center of a representative track. The sinewave floor 21 of the track extends along the entire length of the track and the size and orientation of this floor can be understood by noting that the point 22 represents a peak and the point 23 represents the next peak. The use of a clocking sinewave floor to generate synchronization information, so that the electronics "know" at what rate to expect data, is well-known in the art of optical disk storage.

The choice of whether to use an embodiment which employs a discontinuous track or one in which a track is continuous, or how many wobbled pits to employ to each side of the track, will be based on many factors including the user's ability to create such patterns on the recording media. In embodiments using discontinuities to correct the push-pull tracking signal, the wobble pits may be eliminated altogether, and the corrective signal may then be generated by "zeroing", that is, finding and applying the off-center value as the beam spot 70 passes over the discontinuities. These discontinuities are plain reflective surfaces set in the track sector headers, also called blank areas. In all embodiments such as those represented by FIG. 4A, track sector headers are written at a predetermined interval from each other along the length of each track. The known distance, or number of sinewave clock peaks between each sector header location, together with the configuration of, and pattern, in each sector header provides the demodulation means with the ability to parse or separate out, the push-pull signal, a corrective signal, a track counting signal and a data signal as well as the clock signal from the tracks on the disk surface. This invention comprehends embodiments which do not use sine-wave clock floors in track grooves and these will be explained later.

To illustrate track crossing count determination, reference is made to FIG. 10A, in which a wobble pattern using two wobble pits 31 and 32, a spacer 33 and two wobble pits 34 and 35 on the other side of track 13 continued over the course of three track sector headers on three tracks. The wobbling pattern for this is shown to vary the timing patterns of FIGS. 10B, 10C, 10D and 10E as centered lines A, B, C, and D of the path of the reading spot cross the edges of tracks when in track crossing (seek) mode. It can be easily seen that counting from peak to peak of the resultant signal, or any one period measure of the signal, shows that the spot has crossed from one track to the next.

The pattern of two pair of double wobble spots on each side with empty (nonwritten) track segments between them in a left, space, right, space, left, space, right, space sequence comprises one successful pattern. Track crossing count will not be missed by the push-pull signal with such a sequence even at a track crossing speed which allows a track to be crossed radially at the longitudinal length of four timing spots. (A completely continuous track with the same pattern of wobbling will eliminate even this restriction on track crossing speed.) Assuming the implementation of FIGS. 10A and 10B to illustrate track crossing count generally, note that actual peak 3 of FIG. 10B occurs at the crossing of line A of FIG. 10A with the location 5, and also note that trough 2 is found at the crossing of line A with the left edge location 6 of track 15. A similar function is observed for lines B, C and D in FIGS. 10C, 10D and 10E, respectively. The dotted lines of FIGS. 10B–10E represent the signal generated by the same crossings of lines A, B, C, and D taken over tracks without such discontinuities. Thus, in either case, as each center line crosses one track, one sinewave signal is generated, and counting the cycles of these sinewaves gives the number of tracks crossed. Remember that the timing diagrams are triangularized for clarity and that the push-pull signal would appear to be more sine wave like in reality.

Figure 11A:
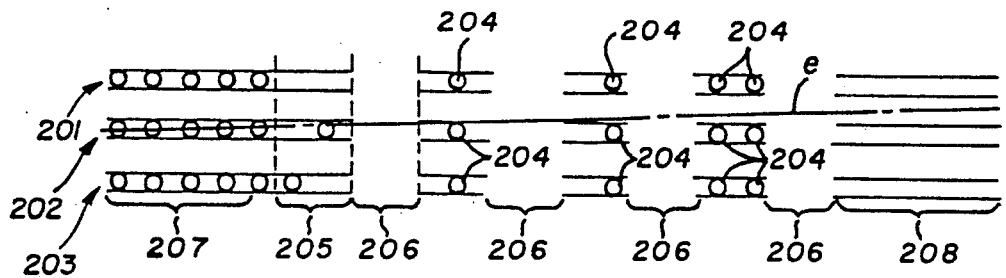
FIGS. 11A and 11B depict track embodiments using discontinuities and the push-pull signal generated thereby, respectively.
Figure 11B:

FIGS. 11A and 11B are referenced here to illustrate the nature of D.C. or low frequency push-pull signal variance used for track following. Line E of FIG. 11B is the push-pull signal which would be derived from an accurately aligned system in using a beam spot whose center travels along line e of FIG. 11A. FIG. 11A shows an example configuration of three radially adjacent header areas 201, 202 and 203 with qualifier pits 204, address pits 205, discontinuities 206 and synchronization pits 207 and data areas 208 located in accordance with the teachings herein.

In all embodiments using discontinuities, it can be easily seen (in the use of refective media) that the reflection of a beam from the discontinuity will be of a greater intensity than its reflection during the time when the beam spot is over the grooved areas, and greater still than the intensity of the reflection from the written areas.

Because of this fact, an automatic gain control is required to compensate for the resultant variance in signal intensity so that the signals from the three described areas can be mixed.

To illustrate, an adaptation of a discontinuity based embodiment which relies on numerous headers is described with reference to FIGS. 4B, 4C, 4D, 4E and 4F. The embodiment shown in these figures eliminates the need for a gain control to compensate for the presence of data because employing it eliminates the need to use the push-pull signal generated over the data areas for part of the tracking signal.

Specifically, the blank area or discontinuity 314 is seen at positions 2 through 11 of the second servo byte 311. The clear indication of its termination is given by the pit written at position 12 as seen in the Sum Signal 299 of FIG. 4B(iii). The sum signal also shows the difference between the reflectivity of the pregrooved area at position 1 and position 2 (the first position of full blank area). From this observation, it is clear that a measure of the D.C. offset in the sum signal would be lost amidst the data signal without continuous automatic gain control. Where only the signal generated by the unwritten pre-groove area and the blank (or discontinuity) are used for tracking, the difference in gain between the signals of these two areas will be substantially constant.

As is known in the art, use of high read power levels may damage the data areas. The blank area (discontinuity) signal is used to check read power levels and the laser level is adjusted downwardly if it is too high, thus a secondary gain control circuit is established.

This invention teaches that a data area need not be used to generate the push-pull signal and how adequate tracking can still be accomplished without such use, but it also demonstrates that continuous push-pull signal can be used for tracking with correction and describes means to do so.

Figures 4B, 4C:
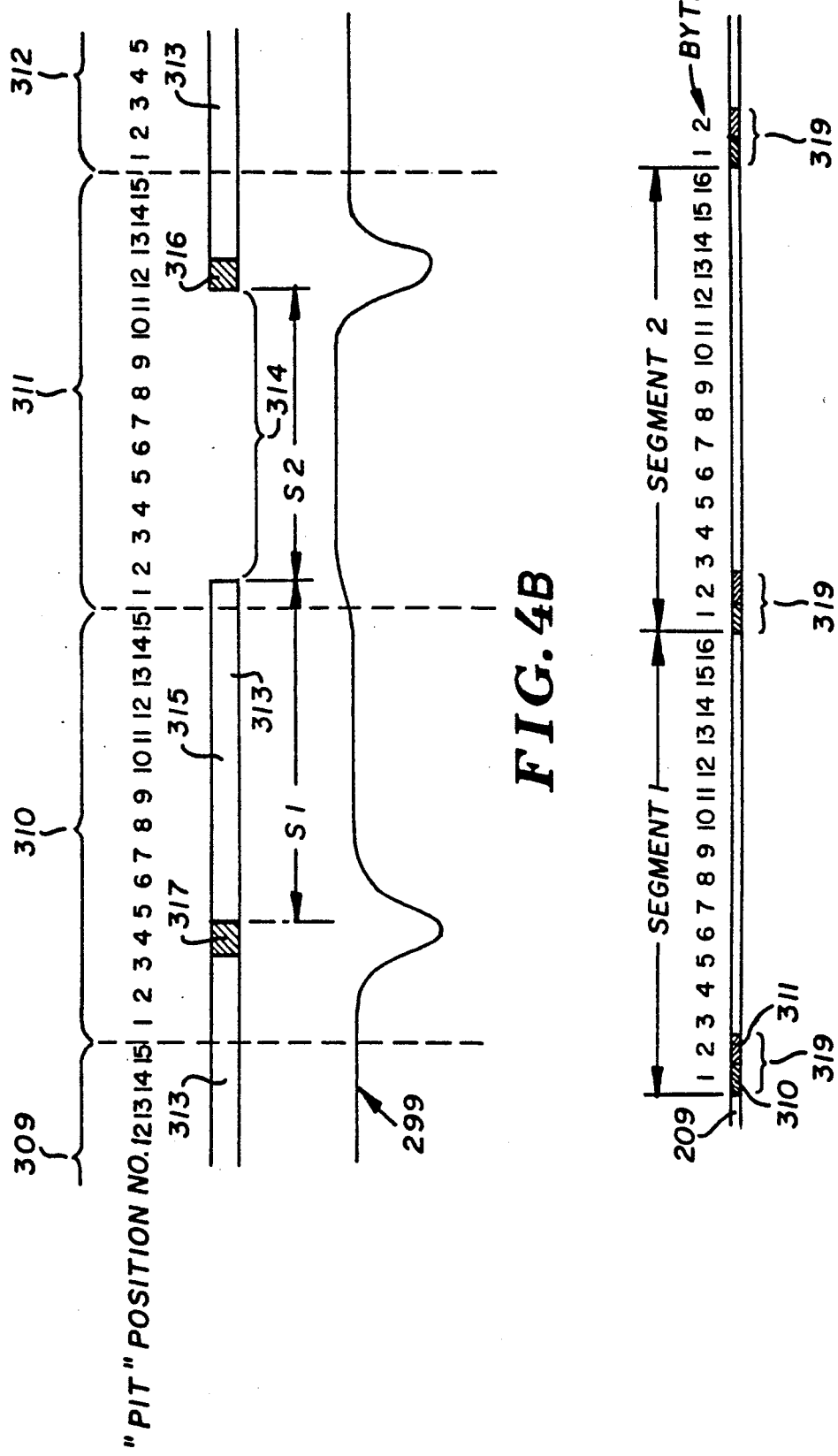

While providing for simplified gain control, the formats suggested in the FIGS. 4(B–F) affect the systems employing them in a number of ways and there are a number of other points which should be considered for those formats. First, a complete explanation of the formats themselves should be had, starting with an overview of FIG. 4C. Shown in this figure is a segment of a data area in one of the track sectors which may be considered the equivalent to the track sectors of FIG. 4A. The headers areas are assumed to contain normal track address, sector and synchronization information. Each sector data area, usually following a sector header area, would be divided up into a number of segments, such as segment 1 and segment 2, each shown with two servo bytes 319 at the head of each segment. If each segment is 16 bytes long then the last 14 bytes of such segment would be considered available for user data. The size of the segment chosen will depend on a number of factors including the size of the sector, the size of the modulation code used for writing data, and the amount of servo byte pair repetitions required so that there can be enough sampling of the servo areas per unit of time so that the phase lag of the servo responses is not great enough to impair servo function. Another factor in determining the amount of servo byte area required is the need to write user data or have user data space available.

This servo byte format also eliminates the need for a sine-wave floor in the user data areas and groove areas of the track for clocking. However, if the method of clocking described below is employed then it is advisable to keep these servo bytes in line from track to adjacent track. Doing so will enable a system employing such media to have accurate clocking during track seeking as well as during track following.

A simple configuration of the use of the blank area or discontinuity in servo bytes which are not in the header areas may be described with reference to FIG. 4B.

Note first that each "byte" (including servo byte 310 and servo byte 311) of the servo area is divided into 15 spaces. This is representative of one data modulation code in which data can only be written in a certain number of the 15 spaces available for holes for each byte, i.e. 8 bits of information. Note also that the servo type modulation in the servo bytes cannot be one of the 16 recognizable modulations forms under whatever modulation code is used. This unique signal can be used as a qualifier signal and the update which normally occurs at the passing of each pair of servo bytes for all sampled signals (including for instance clocking, focusing, tracking, the level of the sum signal, and the laser "read" level) can be disabled by this qualifier signal. Since a pit is not allowed in the modulation code used in this example at position 4 of the servo byte 310, illustrated in FIG. 4B, a pre-groove 315 after the pit 317 and the blank area 314 after the pre-groove 315 are sampled to set the levels of the sample signals just mentioned. Detection of the pit 316 at position 12 of the second servo byte 311 updates the clock thus allowing the clock to be constantly resynchronized at the occurrence of every pair of servo bytes in a data area. Note that the clocking hole at position 12 is placed directly after the blank area (or discontinuity) in order to avoid transients in the read signal which might generate a false trigger in the clocking circuit. This allows for very exact synchronization, without the use of the sine-wave clocking floor utilized in the embodiments whose only servo area is in the header areas.

There are several advantages to not using a sine-wave clocking floor. Because this invention does not use a sine-wave clocking floor, user data holes do not destroy any part of the clock and therefore bit density is not limited by that type of destruction. Therefore, unevenly distributed user data holes do not introduce any signal components which might create clock pull. Further, the bit density limitation imposed on the user data by the sine-wave clock floor frequency does not exist. The sine-wave clock floor may be written at, or near, the limits of optical disk drive resolution capabilities, thus increasing bit frequency may make it difficult to resolve the clock in such systems. The sampled servo byte does not have this problem. Nor does the user data modulation code have to provide a zero signal power content in the frequency spectrum at the clock frequency. Nor need any compromise be struck between the amplitude of the clocking sine wave in the pre-groove and direct read during write detection.

In the use of the servo byte embodiment and the design of the format for these servo bytes, other considerations may still be pointed out with reference to FIG. 4B. Note that the two pits used must be chosen to be in locations such that user data holes which are written adjacent to the servo byte cannot introduce clock pull. It is felt that three free positions in a fifteen position code will provide enough free space to eliminate any potential for clock pull. Since sampling of most signals is done in the blank area, it must be made of sufficient length to allow for accurate detection yet it must also be short enough not to interfere with reliable track counting as was explained above with reference to FIG. 10A.

Also, the free pre-groove area in the first servo byte must be chosen long enough to register the push-pull signal since with the servo byte embodiments, no other area besides the blank area is used for generating a D.C. offset. Note however, that where the "qualifying" pattern of the servo byte area is not properly detected, and enough track length has gone by so that proper track centering may be lost, the uncorrected, continuous push-pull signal might be temporarily employed for tracking. The same use of uncorrected push-pull signal would be employed with the header located discontinuity. However, where there are far fewer discontinuities to check the push-pull signal this use of an uncorrected signal is critical. Consequently, tracking may be lost completely if qualifier modulations are not employed.

FIG. 4D and FIG. 4E illustrate variations of the pattern described in FIG. 4B which use wobbled pits 318 as a part of the qualifier signal and which may also be used for track following as is described above with reference to wobbled pits in header areas. However in these embodiments, clocking would be accomplished in the manner described with reference to FIG. 4B and the blank area may be used for track correcting and sampling of sampled signals (focusing, laser level, variation in intensity of the four quads, and quad sum level). FIG. 4E may be written with a simple, single laser mastering machine as can the formats of FIG. 4B and 4F. With reference FIGS. 4(D-F) by virtue of there being so many servo bytes per unit track length, a tracking signal may be entirely derived by the use of the wobble signal. FIG. 4F illustrates a two servo byte format which might be used if track counting at high speeds is not required.

For the various format types described, differing circuitry must be employed to parse the relevant signals from the detector.

Where the invention employs wobbled or off-center pits, track following signals are created generally, with reference to FIG. 8, as follows:

A positive voltage is applied across resistor R1 to both cathodes of the detector 80.

Detector 80 is shown here as a split photo diode or pair of incident radiation detectors because this is the minimum configuration necessary for the function of such a detector with this invention. (Ordinarily, a quad detector is used to optimize focusing ability and for other reasons unrelated to this invention. Merely tying the two inputs and two outputs of both the left and of the right sides of the quad together would yield the equivalent to what is shown here.)

The sum of the modulations detected by detector 80 appears at the input to amplifier 108, whose output is the "central aperture" signal, a reflection of the overall modulation in the beam returned from the media. Directing this signal through circuit 111 which has phase locked loop and associated data demodulating logic brings the incoming signal into phase with the system clock. The data signal and timing confirmation signals will appear on line 97. Timing logic 102 will pass the part of the, now, in phase central aperture signal occurring during a sector header to Qualifier 101. Timing logic 102 checks a predetermined pattern in phase with Circuit 111. Therefore, the timing logic 102 could simply signal the Qualifier 101 on line 102a during a sector header and Qualifier 101 could just read that part of signal which it could receive directly from a line 97b during such a sector header. The preferred embodiment, however, passes the signal from line 97a through Timing 102 to the Qualifier 101 by line 102a during such sector headers. Either method would work. Qualifier 101 is enabled during a nonseeking mode, i.e. track following condition, by line 103. When enabled it detects whether the qualifier code embedded in the sector header (described above; Refer to FIGS. 4A, 11A) matches what is expected and, only if so, it enables Sample and Hold gate 90 to pass the wobble signal to low pass filter 99.

The central aperture signal from amplifier 108 is also supplied to right and left peak detectors 84 and 85, respectively. These peak detector logic circuits are enabled by the timing logic 102 which enables left peak detector 85 through input 88, but only during a left window (time a left wobble signal would be present) and also enables right peak detector 84 by line 86 when a right window is present. Outputs of these peak detectors are supplied to differential amplifier 89 whose output is supplied to Sample and Hold gate 90, and allowed to pass as the "wobble signal" when "qualified" as explained in the previous paragraph. This wobble signal corrects the push-pull signal.

To find the push-pull signal, the anodes of detector 80 are tied to the inputs of a differential amplifier 94, whose output at line 95 is the push-pull signal. High pass filter 109 and low-pass filter 99 have the same "corner" (also called "break") frequencies thus allowing the components of the push-pull and wobble signals to merge, at that corner frequency. That is, the push-pull signal generated at the output of the differential amplifier 94, after being filtered by the high pass filter 109, is combined with a wobble signal, after the wobble signal is filtered by means of the low pass filter 99. This combined or resultant signal is a corrected tracking signal. This signal is then amplified by amplifier 91 and supplied to track following logic 117 and servo control logic 115 to cause servo mechanisms 150 to accurately follow the track. Mixing of the signals may be achieved via the direct connection of the output of the low pass 99 with line 109a (not shown) or by bringing line 99b and 109a directly to amplifier 91 as shown.

When seek status line 103 disables this Qualifier 101, only the push-pull signal passes to amplifier 91, providing the sinewave push-pull signal (FIGS. 10A–10E) used by track counting logic 116.

Figure 8:
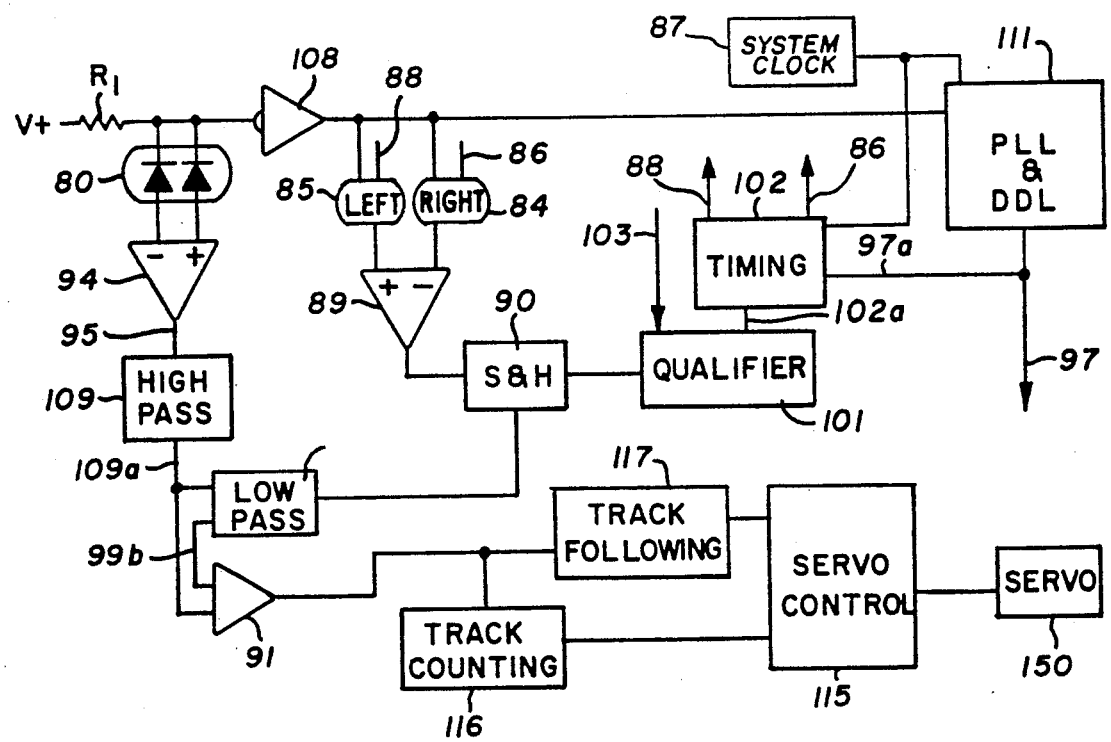
FIG. 8 is a block diagram depicting logical circuitry which may be used to parse the photodetector signals in one preferred embodiment.

Qualifier 101 may be eliminated from the circuit of FIG. 8 altogether if one is willing to sacrifice the redundancy it provides. A Sample and Hold gate, enabled on the occurrence of a header indicated by timing logic 102 during a non-seek status indicated by line 103, could act as a substitute. Use of a Qualifier is preferred. It enables the system to shut down focusing, laser level and other adjustments in the event of a misreading as previously explained with reference to FIG. 4A et seq.

Figure 9:
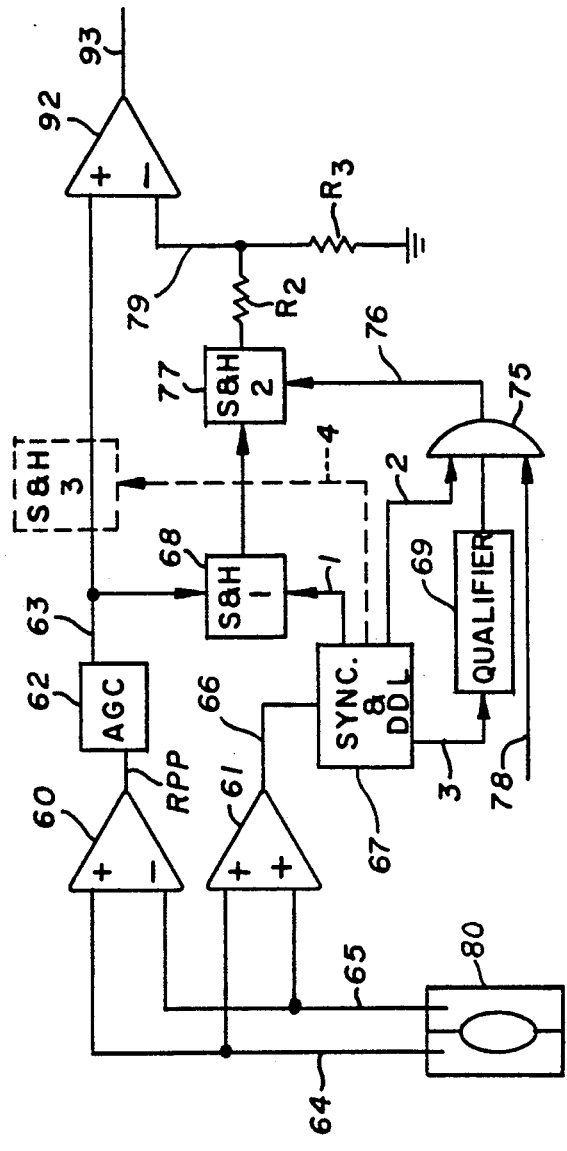
FIG. 9 is a block diagram depicting logical circuitry which may be used to parse photodetector signals in another preferred embodiment.
Figure 13:
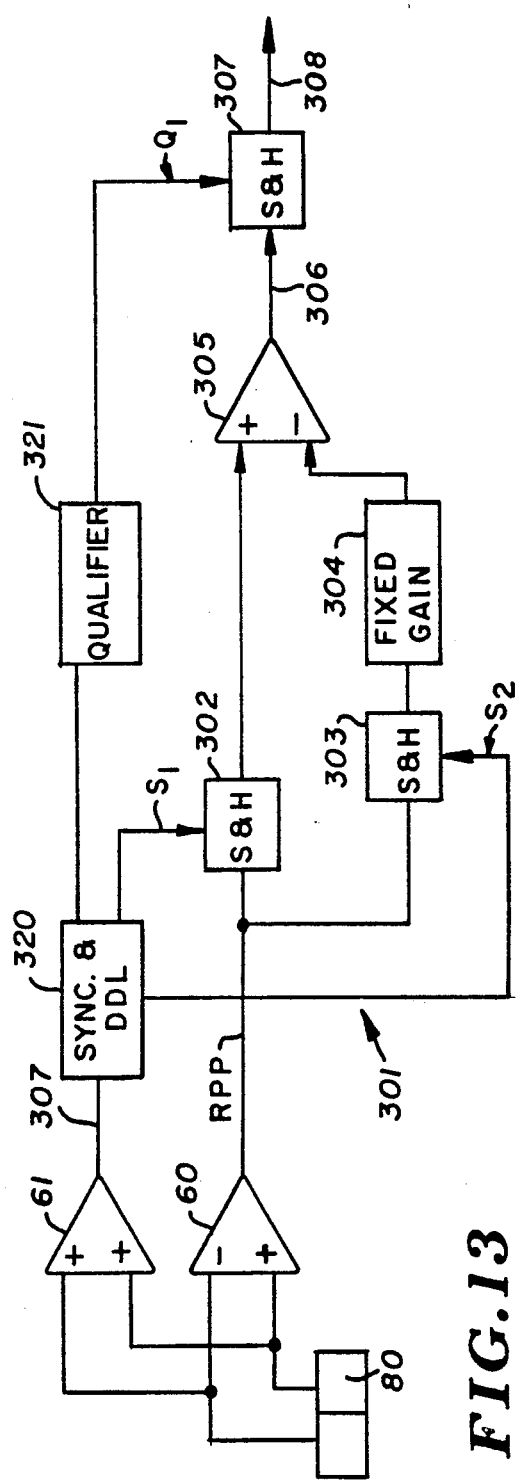
FIG. 13 is a block diagram illustrating circuitry which may be used to parse photodetector signals in still another preferred embodiment.

To employ the signals generated by discontinuities in the track headers for the corrected tracking signal, circuitry such as that described in FIG. 9 should be employed. In FIG. 9, quad photodetector 80 is represented by a split panel, but the same general general considerations as to its form apply to this circuit as they do to detector 80 of FIG. 8. In the circuit of FIG. 13 the push-pull signal is also generated by a differential amplifier 60, each of the two inputs to this amplifier being responsive to a signal generated by either half of detector 80.

Lines 64 and 65 may be amplified jointly by amplifier 61 to produce an amplified sum signal on line 66 representative of the central aperture signal. This central aperture signal is supplied to synchronization and data demodulation circuitry 67 which, in turn, enables (via line 1) Sample and Hold gate 1 (68) on the occurrence of, and for approximately the duration of, each discontinuity. Synchronization and data demodulation circuitry 67 anticipates the passage of a discontinuity by looking at the number of clock pulses between headers, as well as synchronization information which may be contained at the beginning of a track sector header as shown in FIG. 11A, for example. Synchronization and demodulation circuitry 67, may pass on line 3 either the segment of the signal received which it interprets as a qualifier signal or some larger portion of the synchronized signal to the Qualifier 69 for a comparison. Qualifier 69 will not disable the output of AND gate 75 unless there is a mismatch between the qualifier signal received from circuit 67 and the expected qualifier signal in the comparator of Qualifier 69. (This is a similar function to that of Qualifier 101 in FIG. 8.) Circuit 67 will send an enabling pulse on line 2 to AND gate 75 for a length of duration equal to the size of the sector header length in the preferred embodiment, or at some other length sufficient to allow the push-pull signal from Sample and Hold gate 1 (68) to pass through Sample and Hold gate 2 (77), which is limited by this pulse on line 2. Of course, AND gate 75 will be prevented from delivering an affirmative signal on line 76 to Sample and Hold gate 2 (77) if line 78 is low thereby indicating that the drive unit is in track seeking mode rather than track following mode.

Figure 12:
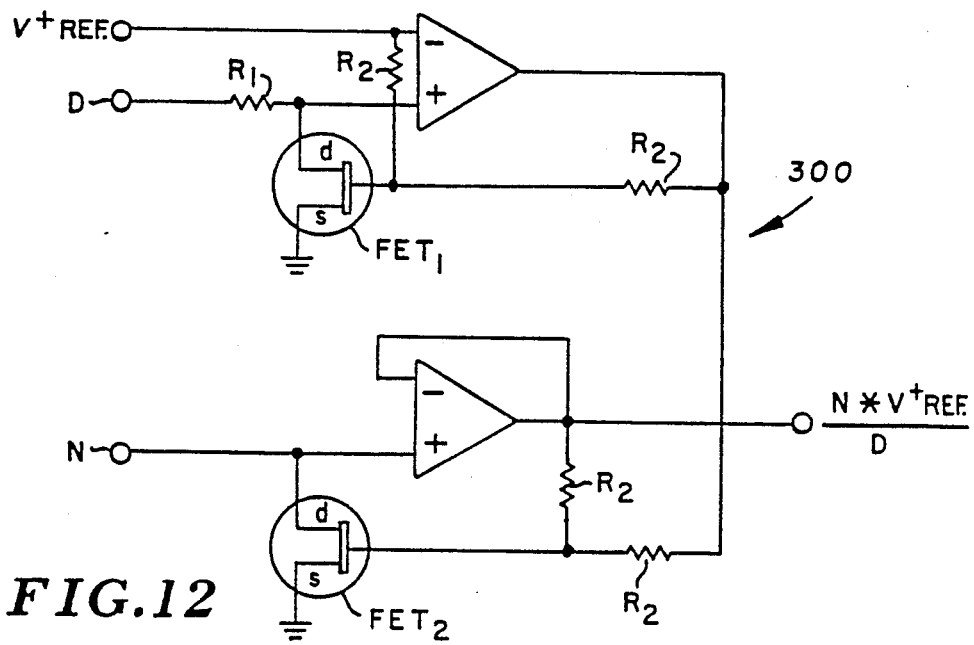
FIG. 12 is a circuit diagram which depicts an approach to the AGC function for use of discontinuities in header areas only.

Radial push-pull signal (RPP) from differential amplifier 60, is supplied to an Automatic Gain Control Circuit 62 to provide a usable signal on line 63. Without some kind of gain control the variance in the RPP signal caused by the presence of user data areas, non-written areas of track groove and blank areas would not provide a usable signal. Therefore, in the embodiments requiring it, Automatic Gain Control (AGC) may be accomplished in a number of ways as is known in the art, but for its application to this invention several limitations must be observed. No D.C. offsets can be introduced by the AGC and the variance in input voltages must be handled without distortion. (These limits on AGC are not necessary for its application to the two servo byte embodiments.) By way of illustration only, FIG. 12 is provided, showing a circuit 300 having matched pair of FETs (Field Effect Transistors) with positive voltage input to circuit 300 at point D. It is stressed, however, that the form of AGC will vary considerably with the requirements of the system in which it is employed, but it is believed that the description just provided illustrates succinctly the best approach to the AGC problem.

The signal on line 63, the normalized push-pull signal, is a low frequency signal that is held up by Sample and Hold gate 1 (68) unless circuit 67 allows Sample and Hold gate 1 (68) to open by an enabling pulse on line 1. This signal from Sample and Hold gate 1 (68), if qualified by Qualifier 69, occurs during the time of passing of a sector header as determined by synchronization and data demodulation logic 67. If the machine is in a track following mode this signal may then be passed by Sample and Hold gate 2 (77). That is, Sample and Hold gate 2 (77) is enabled by AND gate 75.

Resistors R1 and R2 can be used to adjust the signal appearing at line 79 so as to compensate for voltage differences between this signal and the signal at line 63 which may result from incomplete gain normalization by circuit 62 and the track groove geometry. The inputs from lines 79 and 63 when fed into a differential amplifier 92 produce the offset corrected tracking signal on line 93. Note that a third Sample and Hold gate, S&H 3 (in ghost), could be added as an enhancement to limit the portion of the radial push-pull signal which reaches op-amp 92 on line 63. This could be used to equalize the duration of the signals received by op-amp 92 over lines 79 and 63 by making the "pass through" type operation of S&H 3 depend on pulses from the Synchronization and data demodulation circuitry 67. These pulses (on dotted line 4) might, for instance, be issued between written data pits.

Where the device is used to count track crossing, (during track seeking) no output is permitted through Sample and Hold gate 2 (77) and therefore no offset occurs in differential amplifier 92. Hence, the output of the circuit of FIG. 9's differential amplifier 92 may be used in a manner identical to the output of amplifier 91 of FIG. 8. If synchronization is correct during seek, output can be permitted through Sample and Hold gate 2 (77), and the track count may still be found at the output of differential amplifier 92.

To describe the finding of the tracking signal in the radial push-pull signal from the servo byte formats described in FIGS. 4B, 4D and 4E, reference should be had to FIG. 13 and 4B. Based on either timing or the detection of the servo pits in the first servo byte, signals S1 and S2, developed by synchronization and data demodulation circuit 320, are provided to Sample and Hold Gates 302 and 303 respectively, so that each may pass that portion of the radial push-pull signal to be sampled. Sample and Hold Gate 302 will pass the portion of the radial push-pull signal represented by the pre-groove which, for example, would correspond to the section length S1 of FIG. 4B. Sample and Hold Gate 303 responding to signal S2 would pass that portion of the radial push-pull signal representative of the blank or discontinuity portion of the second servo byte, by way of example section S2 in FIG. 4B. Because there is no indeterminate gain variance, that is, the difference in gain between the pre-groove area and the blank area will always be substantially the same, a fixed gain reduction 304 may be applied to the radial push-pull signal generated by the blank area. The two sampled portions are provided as input to differential amplifier 305 generating a corrected signal at line 306. If the proper qualifier does not appear in the data signal then signal Q1 developed by Qualifier 321 will not allow Sample and Hold Gate 307 to pass a tracking signal 308.

Note that the use of the same detector means 80, summing amplifier 61 and differential amplifier 60 of FIG. 13 is similar to their use in FIG. 9.

Synchronization and Data Demodulation Logic circuit 320 receives the sum signal from summing amplifier 61 and works similarly to the analagous circuit 67 of FIG. 9, i.e. counting internal clock pulses between servo areas to provide said signals S1 and S2 and Q1 through Qualifier 321. The circuit 320 clock pulses are updated by timing pits rather than by a sine wave varying floor height.

The circuit diagrams of FIGS. 8, 9 and 13 illustrate the best mode known to the inventors herein for producing offset corrected tracking signals from the preferred record media described, and all the elements included are to enable one of ordinary skill in the art to make or use the invention. Still, they are drawn in general terms to avoid unnecessary limitations. Note, for example, that resistors R1 and R2 of FIG. 9, which provide gain compensation, should be regarded only as an examplary circuit element pair. Also the output of synchronization circuit 67 could for example, be input to a second AND gate instead of AND gate 75 and the output of AND gate 75 could also be directed to the input of that second AND gate and the result would produce the same signal on line 76. The constraints of the particular device employed as well as limitations of the media employed will suggest alternatives or enhancements to the circuits described without departing from the scope of this invention.

We claim:

1. An optical disk recording system for providing a corrected tracking signal, comprising:

a record carrier;

radiation beam means for generating a radiation beam, directing said radiation beam to said record carrier and receiving a modulated radiation beam therefrom;

first means responsive to said modulated radiation beam for generating a first tracking-related signal;

second means responsive to said modulated radiation beam for generating a second tracking-related signal;

third means for providing variable gain adjustment to said first tracking-related signal thereby producing a third tracking-related signal;

fourth means responsive to said second tracking-related signal for producing a qualifier signal and a fourth tracking-related signal;

fifth means, responsive to said fourth tracking-related signal, for sampling said third tracking-related signal to generate a fifth tracking related signal; and sixth means including means for receiving said qualifier signal and means for combining said third and fifth tracking-related signals for producing the corrected tracking signal;

said record carrier has a plurality of header areas and at least one discontinuity located in each of said header areas and further has at least one qualifier modulation means for use in producing said qualifier signal and at least one record carrier modulation means used in producing a signal used by said fifth means.

2. An optical disk recording system for providing a corrected tracking signal, comprising:

a record carrier;

radiation beam means for generating a radiation beam, directing said radiation beam to said record carrier and receiving a modulated radiation beam therefrom;

first means responsive to said modulated radiation beam for generating a first tracking-related signal;

second means responsive to said modulated radiation beam for generating a second tracking-related signal;

third means for providing variable gain adjustment to said first tracking-related signal thereby producing a third tracking-related signal;

fourth means responsive to said second tracking-related signal for producing a qualifier signal and a fourth tracking-related signal;

fifth means, responsive to said fourth tracking-related signal, for sampling said third tracking-related signal to generate a fifth tracking related signal; and sixth means including means for receiving said qualifier signal and means for combining said third and fifth tracking-related signals for producing the corrected tracking signal;

said first signal is a radial push-pull signal and said second signal is a central aperture signal.

3. A record carrier wherein said record carrier has an information layer having tracks for storage of data, the information layer being a reflective surface, said tracks being comprised of longitudinally disposed sectors, each sector having an associated header and data area, said tracks being so arranged and disposed to form a diffraction grating arrangement and disposition of tracks that comprises a track floor situated between lands on either side thereof, said record carrier comprising:

a first record carrier modulation means located in said record carrier sector header, said first record carrier modulation means comprising at least a first discontinuity, said first discontinuity being a continuation of the lands across a portion of at least one track wherein said first discontinuity is substantially a flat surface coplanar with the lands and in which said first discontinuity is substantially in a non-staggered relationship relative to the track center line of said one track;

a second record carrier modulation means located in said record carrier sector header a predetermined distance from said first record carrier modulation means and including at least one qualifier modulation means, said one qualifier modulation means being at least one non-reflective pit located a predetermined distance from said first discontinuity and wherein said pit is recessed relative to the lands; and a third record carrier modulation means including timing means;

wherein said header includes a second discontinuity and each of said first and second discontinuities includes an end portion with section of said one track being disposed between said end portions and wherein said section of said one track is of the same order of magnitude in length as the length of at least one of said first and second discontinuities.

* * * * *